Aug. 22, 1939.   O. L. CRONK   2,170,012
VEHICLE WHEEL TRUCK
Filed Dec. 7, 1938
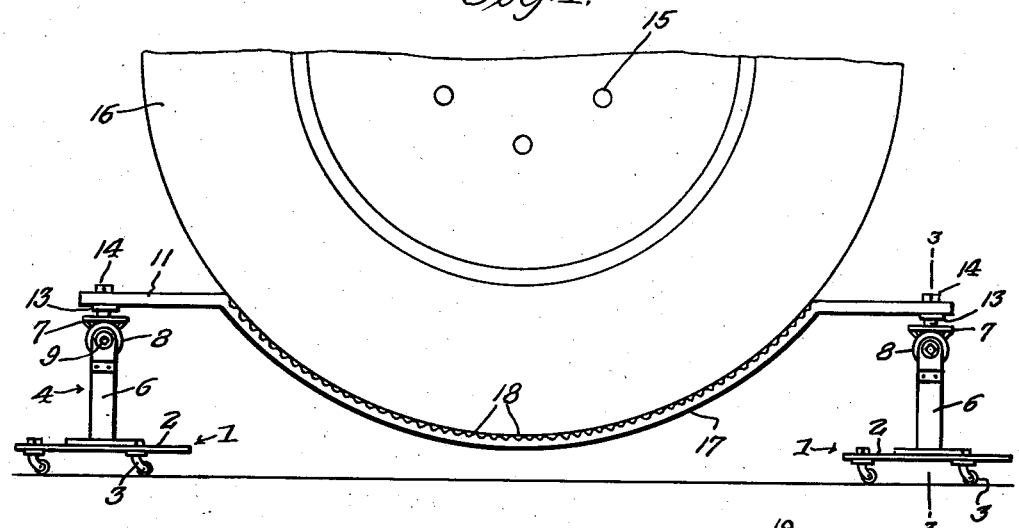
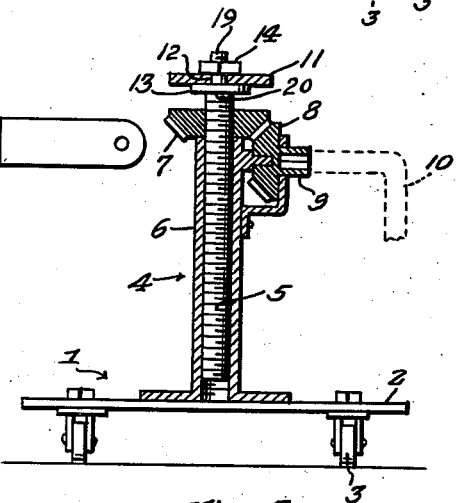
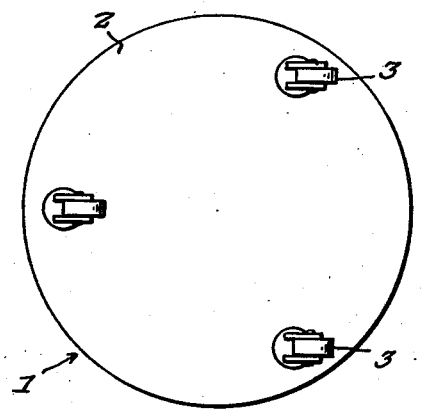
Inventor
Oscar L. Cronk
By Clarence A. O'Brien
and Hyman Berman
Attorneys Patented Aug. 22, 1939

2,170,012

UNITED STATES PATENT OFFICE 2,170,012

VEHICLE WHEEL TRUCK

Oscar L. Cronk, Oswego, N. Y.

Application December 7, 1938, Serial No. 244,486

1 Claim. (Cl. 254—7)

The present invention relates to new and useful improvements in vehicle wheel trucks and has for its primary object to provide, in a manner as hereinafter set forth, a device of this character comprising novel means for lifting comparatively heavy wheels with tires thereon to facilitate mounting said wheels on the hubs, which, as usual, are left on the axles of the vehicle.

Another very important object of the invention is to provide a truck of the aforementioned character which may be conveniently rolled from place to place with a wheel mounted in position thereon.

Other objects of the invention are to provide a vehicle wheel truck of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of an embodiment of the device, showing a vehicle wheel and tire mounted thereon.

Figure 2 is a bottom plan view of one of the carriages.

Figure 3 is a vertical sectional view, taken substantially on the line 3—3 of Fig. 1.

Figure 4 is a top plan view of the supporting bar.

Referring now to the drawing in detail, it will be seen that the embodiment of the invention which has been illustrated comprises a pair of duplicate carriages which are designated generally by the reference numeral 1. Each carriage 1 includes a base 2 in the form of a circular plate of suitable metal having mounted therebeneath a plurality of caster wheels 3.

Fixed on each carriage 1 is a screw jack which is designated generally by the reference numeral 4. The jacks 4 comprise screw shafts 5 which are slidable vertically in tubular housings 6, said housings being fixed on the bases 2. The screw shafts 5 terminate in reduced, threaded upper end portions 19 providing shoulders 20. The screw shafts 5 are raised and lowered through the medium of beveled gears 7 and 8. The gears 8 are provided with sockets 9 for the reception of a removable operating handle 10.

The reference numeral 11 designates a metallic supporting bar which extends between the jacks 4. The end portions of the supporting bar 11 are provided with openings 12 for the reception of the reduced upper end portions 19 of the screw shafts 5, said supporting bar resting on collars 13 which are fixed on said screw shafts on the shoulders 20. Retaining nuts 14 on the end portions 19 secure the bar 11 on the screw shafts 5.

The reference numeral 15 designates a portion of a conventional vehicle wheel with a tire 16 mounted thereon. The bar 11 comprises an arcuate intermediate portion 17 for the reception of the tire 16. The upper side of the intermediate portion 17 of the bar 11 is toothed or roughened, as at 18, to prevent slipping of the tire 16 therein.

It is thought that the manner in which the device is used will be readily apparent from a consideration of the foregoing. Briefly, the wheel 15 with the tire 16 thereon is mounted on the truck and rolled to the desired location on the caster wheels 3. The caster wheels 3 greatly facilitate positioning of the wheel relative to the vehicle. Then, by raising the jacks 4 through the medium of the handle 10, the wheel 15 may be conveniently elevated in a manner to align the usual holes therein with the threaded attaching studs which project from the hub on the axle of the vehicle. With the holes in the wheel 15 thus aligned, said wheel may be conveniently slipped on the attaching studs. The device may also be used to facilitate the removal of heavy wheels and tires thereon.

It is believed that the many advantages of a vehicle wheel truck constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A truck of the class described comprising, in combination, a pair of carriages, each carriage including a base and caster wheels mounted beneath said base, jacks mounted on the bases of the carriages, said jacks including vertically movable screw shafts comprising reduced, threaded upper end portions providing shoulders and manually operable means for actuating said screw shafts, collars mounted on the upper end portions of the screw shafts on the shoulders, a bar, for supporting a vehicle wheel, mounted on the reduced portions of the screw shafts and resting on the collars for raising and lowering by the jacks, and nuts threaded on said reduced portions of the screw shafts for securing said bar thereon, said bar including an arcuate intermediate portion for the reception of the vehicle wheel, the upper side of said arcuate intermediate portion being roughened.

OSCAR L. CRONK.